INVENTOR.
PAUL KEHLER
BY Young and Quigg
ATTORNEYS

Aug. 24, 1965                P. KEHLER                      3,202,822
            METHOD OF DETERMINING DENSITY UTILIZING A GAMMA
                    RAY SOURCE AND A PAIR OF DETECTORS
Filed Nov. 13, 1961                                    3 Sheets-Sheet 3

INVENTOR.
PAUL KEHLER

BY *Young and Quigg*

ATTORNEYS

United States Patent Office 3,202,822
Patented Aug. 24, 1965

3,202,822
METHOD OF DETERMINING DENSITY UTILIZING A GAMMA RAY SOURCE AND A PAIR OF DETECTORS
Paul Kehler, Bartlesville, Okla., assignor to Phillips Petroleum Company, a corporation of Delaware
Filed Nov. 13, 1961, Ser. No. 151,952
20 Claims. (Cl. 250—83.3)

This invention relates to a method for determining the density of materials. In one aspect this invention relates to determining the density of materials which are not directly accessible.

This application is a continuation-in-part of my co-pending application Serial No. 80,415, filed January 3, 1961, now abandoned.

Radioactivity has long been used for the determination of the density of materials. The simplest way is to measure the attenuation of a beam of photons passing through the material of interest. An example of this method is the measurement of the density of soil, where a source of gamma rays and a detector are lowered into the ground in two different holes. In this case, the intensity I registered by the detector is $I=I_0 e^{-\mu L}$, where $I_0$ is the intensity before absorption, L is the distance between the source and the detector, and $\mu$ the absorption coefficient of the soil. This $\mu$ is a measure for the number of electrons present in a unit of volume, and thus for the density. Very often, however, the material of interest cannot be placed between the source and the detector. In this case gamma scattering methods, where a collimated source and a detector are placed on the surface of the material, must be used. The backscattered photons (Compton scattering) are registered by the detector. Since the number of backscattered photons depends on the electron density of the material, a count thereof is a measure of the density of said material. The physics of an instrument suitable for making such a measurement are very complicated because the detector registers photons of different energies (due to different scattering angles), and also because the photons are attenuated during the passage through the material. The attenuation of said photons is also a function of the electron density of said material. The situation becomes even more complicated, when the material of interest is not directly accessible as when other substances, such as the wall of a container or a protective coating, are placed between said material and the measuring instrument. In such cases the measured data cannot be interpreted universally and individual calibration curves must be taken for each condition.

In oil exploration and recovery operations, it is often useful to have information regarding geological strata penetrated by bore holes. One important property that can be measured to provide such information is the density of the formation or formations penetrated by the bore hole. Different types of earth formations have different densities so that a knowledge of said densities is of value in identifying the particular formations. If the rock matrix is known, a knowledge of the formation density enables the determination of the porosity of the formation. The interpretation of seismograph and gravity meter data can be considerably improved by correlation with density logs revealing some of the major changes in the lithology. Rock densities are often closely associated with seismic wave transmitting properties and it is thus apparent that a knowledge of the depths at which density changes occur is highly valuable in predicting where major reflections should be obtained in seismic prospecting. A knowledge of the depth and extent of formations having densities contrasting with neighboring formations is an aid in overcoming the problem of lack of depth resolution in gravimetric prospecting.

So-called gamma-gamma well logging methods employing so-called "densilog" devices are commonly run for the measurement of density of the formations penetrated by a bore hole. In such methods, the density measurement is strongly influenced by the separation of the sonde from the wall of the bore hole. This separation can be caused by crooked holes, by cave-ins, and by varying thickness of the mud cake on the wall of the bore hole. In all of these situations unknown amounts of materials are positioned between the logging instrument and the formation. Furthermore, said gamma-gamma well logging methods cannot ordinarily be employed in wells where a metal casing has already been installed.

The present invention provides a method for overcoming the above-described difficulties in measuring the densities of formations penetrated by a bore hole and other materials which are not directly accessible. Broadly speaking, the invention comprises passing gamma rays from a source into a material along at least one path at an incident angle $\phi$ with respect to a reference plane in which said source is positioned; receiving respectively from within said material on first and second detectors which are unequally spaced apart from said source, those Compton scattered photons which have been scattered at an angle $\theta$ with respect to said path of said gamma rays, and measuring the ratio of the responses of said detectors.

An object of this invention is to provide a method for measuring the density of materials. Another object of this invention is to provide a method for measuring the density of materials which are not directly accessible. Another object of this invention is to provide a method of measuring the density of a formation or formations penetrated by a well bore, which method is independent of the separation of the logging instrument from the wall of the bore hole, e.g., by bore hole fluids such as drilling mud, the thickness of the mud cake, whether or not the well is cased, etc. Another object of the invention is to provide a method of measuring the density of materials which are not directly accessible using gamma rays, in which method the depth of investigation can be varied to suit different conditions. Another object of the invention is to provide a method of the type described having increased sensitivity to changes in formation density. Still another object of the invention is to provide a method of the type described which can be carried out with great speed and increased accuracy. Still another object of the invention is to provide a method of measuring the density of formations penetrated by a bore hole, which method can be used to locate interfaces between said formations. Other aspects, objects, and advantages of the invention will be apparent to those skilled in the art in view of this disclosure.

Thus according to the invention, there is provided a method of determining the density of a material, which method comprises: passing a collimated beam of gamma rays, from a source positioned in a reference plane adjacent said material, into said material at an angle $\phi$ with respect to said reference plane; receiving a collimated beam of Compton scattered photons from within said material, at an angle $\alpha$ with respect to said reference plane, on each of a pair of detectors unequally spaced apart from said source; and measuring the ratio of the responses of said detectors, said detectors being sensitive only to photons which have been scattered at an angle of $\theta=\phi+\alpha$ with respect to the said beam of gamma rays.

Employing a collimated beam of gamma rays and receiving collimated beams of Compton scattered photons on each of the pair of detectors as described in the preceding paragraph is in accordance with a presently preferred embodiment of the invention. It is also within the scope of the invention to employ an uncollimated source of gamma rays in the practice of the invention. It is also within the scope of the invention to employ uncollimated detectors in the practice of the invention. However, as a practical matter it is much preferred to employ at least sufficient collimation on the gamma source to direct all the emitted gamma rays from the source into the material the density of which is to be determined, and to employ sufficient collimation on the detectors so as to receive on said detectors Compton scattered photons only within said material the density of which is being determined. It is also within the scope of the invention to employ little or no energy discrimination on the signals received by the detectors. However, in the practice of the invention at least two of the three means (a) collimation of the gamma source, (b) collimation of the detectors, and (c) energy discrimination, should be employed to the maximum practical extent. It is preferred that all three of said means be employed to the maximum practical extent. Thus, in actual practice, it is preferred to employ the highest degree of collimation on both the gamma source and the detectors, and also by energy discrimination to selectively measure or count the narrowest band of signals received by the detectors, which is practical under the particular operating conditions, so as to more effectively screen out doubly and/or multiple scattered photons.

Figures 1, 3, 4:
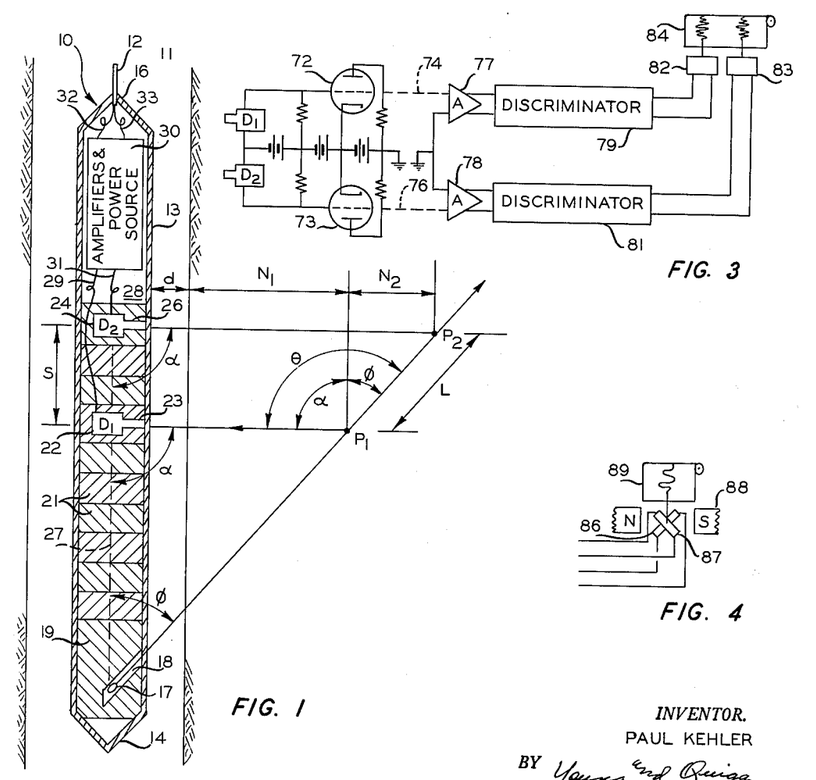
FIGURE 1 is a diagrammtic representation of a well logging apparatus positioned in a bore hole and illustrating one embodiment of the invention.
FIGURE 3 is another schematic circuit drawing of another arrangement of electrical and electronic components which can be employed in carrying out the method of the invention.
FIGURE 4 is a schematic circuit drawing of still another arrangement of electrical and electronic components which can be employed in carrying out the method of the invention.

Referring now to the drawings, where like reference numerals are employed to denote like elements, the invention will be more fully explained. In FIGURE 1, there is shown a logging sonde, designated generally by the reference numeral 10, positioned in a bore hole 11 by means of cable 12 of conventional type adapted to accommodate one or more electrical leads described further hereinafter. Although not shown in the drawing, it will be understood that said sonde 10 can be raised and lowered in bore hole 11 by means of suitable conventional operation equipment positioned at the surface of the earth. Such equipment comprises a motivated reel by means of which cable 12 can be used to raise and lower said sonde, and the signals from said sonde correlated with the depth thereof in the bore hole. An example of such equipment can be found in Patent No. 2,916,691.

Said sonde 10 comprises a housing 13 of substantially gamma ray transparent material, such as aluminum, and is provided with a conical closure member 14 at its lower end and a conical cap structure 16 at its upper end. Although not shown in the drawing, it will be understood that said conical cap 16 is detachably secured to said housing 13 as by means of threads or other conventional means. Positioned within the lower portion of said housing in a block of shielding material 19 is a source 17 of gamma rays, such as $Co^{60}$ or $Cs^{137}$. Said source of gamma rays is positioned within collimating means 18 comprising a relatively narrow slot in shielding material 19. As is well known to those skilled in the art, the purpose of said collimating slot is to direct the gamma rays emanating from said source into the material being investigated at a predetermined angle. A first detector 22, also designated generally as $D_1$, is positioned within said housing as indicated and is provided with a collimating slot 23. A second detector 24, also designated generally as $D_2$, and provided with a collimation slot 26, is also positioned in said housing. A suitable number of blocks 21 of shielding material are positioned within said housing between said source and said detectors as indicated. Said blocks 21 and block 19 can be any of the known good gamma ray shielding materials, such as lead, bismuth, tungsten, or high tungsten alloys. Said detectors $D_1$ and $D_2$ are positioned in the same reference plane as said source 17. As here shown, said reference plane contains the axis of the instrument which is designated by the dotted line 27.

Said detectors $D_1$ and $D_2$ can be any suitable type of conventional detector for receiving backscattered photons from the material being investigated. One presently preferred type of detector is a conventional scintillation type comprising a sodium iodide, thallium activated, crystal and a photomultiplier tube.

Positioned within the space 28 are suitable amplifiers and a power source 30 for transmitting the pulses or signals from said detectors $D_1$ and $D_2$ to the recording equipment at the surface of the earth. Lead wires 29 and 31 are provided for connecting detectors $D_1$ and $D_2$ to said amplifiers and power source 30. Said lead wires 29 and 31 are here shown schematically. It will be understood that they are positioned in suitable conduits extending through the shielding blocks 21. A second pair of lead wires 32 and 33 are provided for transmitting the amplified pulses or signals to the other electrical components, including the necessary recording equipment, which is installed at the surface of the earth.

No specific means has been illustrated for supporting source 17, detector $D_1$, detector $D_2$, and said amplifiers or the shielding material, in said housing 13. Such supporting means form no part of the invention and any suitable mechanical means can be provided for retaining the various components in their proper positions relative to said housing 13. Although said source 17 has been here illustrated as being positioned in the lower portion of housing 13 and the amplifiers and power source 30 positioned in the upper portion of said housing, it will be understood that the respective positions of said elements can be reversed, or arranged in any other suitable manner. The arrangement shown is that most commonly preferred.

In operation, in carrying out the method of the invention, the source 17, such as $Co^{60}$, $Cs^{137}$, or $Hg^{203}$, emits a collimated beam of gamma rays having an energy E into the formation at an angle $\phi$ with respect to the vertical axis of the instrument. The detectors $D_1$ and $D_2$ are of the scintillation type comprising a sodium iodide, thallium activated crystal and a photomultiplier tube, and are sensitized to be sensitive to photons of only one predetermined energy, for example, 200 kev. The energy which is detected by the collimated detectors $D_1$ and $D_2$ can be represented for use here as $E'$. Since the energy of Compton scattered photons is dependent on the scattering angle, the collimated detectors will see radiation coming from only one direction. In FIGURE 1, $E'$ will be the energy of the photons which are scattered at the angle of $\theta = 90° + \phi$ with respect to the original beam of gamma rays. The collimation slots 23 and 26 of detectors $D_1$ and $D_2$ will permit said detectors to detect only photons impinging from a right angle ($\alpha = 90°$) to the vertical, or axis of the sonde. Thus, only photons scattered at the points $P_1$ and $P_2$ will be detected by detectors $D_1$ and $D_2$, respectively.

The cross section, $\sigma c$, for Compton scattering (Klein-Nishina differential cross section) is the same at both of said points $P_1$ and $P_2$ because the scattering angle $\theta$ is the same at both points. In the practice of the invention said scattering angle $\theta = \alpha + \phi$, as discussed further hereinafter.

The generalized form of the equation for the absorption of radiation is $$A = A_0 e^{-\mu x} \quad (1)$$

where:

$A_0$ is the initial intensity at a first point,
$A$ is the intensity at a second point at a distance $x$ from said first point,
$-\mu$ is the absorption factor characteristic of the formation, and is negative since there is a loss in intensity in passing through a material, and
$e$ is the base of the natural logarithims.

In FIGURE 1, the photons from $P_1$ must pass through the formation a distance of $N_1$ and water in the bore hole a distance $d$. If there were casing in the bore hole its absorption would have to be considered. For simplicity purposes the casing has been omitted.

When the intensity of the gamma ray beam is $I_0$ for the point $P_1$, a fraction thereof, $i_1 = I_0 \sigma c$, will be scattered towards detector $D_1$. As the scattered photons pass from point $P_1$ toward detector $D_1$, through the formation a distance $N_1$, and the water or other fluid in the bore hole a distance $d$, a portion of said photons will be absorbed depending upon the characteristics of said formation and said water or other fluid.

Substituting the above value for $i_1$ in the above general absorption equation and using $I_1$ in place of $A$ for the intensity at detector $D_1$, and inserting $C$ to account for the sensitivity of detector $D_1$ toward photons of energy $E'$, we have for the intensity $I_1$ which will be registered by said detector $D_1$:

$$I_1 = CI_0 \sigma c e^{-\mu'_f N_1} e^{-\mu'_w d} \quad (2)$$

where: $\mu'_f$ is the absorption coefficient of said formation for photons of energy $E'$, and $\mu'_w$ is the absorption coefficient of said water or other fluid in the bore hole for photons of energy $E'$.

As the gamma ray beam passes from the point $P_1$ to the point $P_2$ a portion thereof will be absorbed depending upon the characteristics of the formation, and the intensity of said gamma ray beam at $P_2$ will be $I_0 e^{-\mu_f L}$ where $\mu_f$ is the absorption coefficient of said formation for gamma rays of energy $E$, and $L$ is the distance between the points $P_1$ and $P_2$. A fraction, $i_2 = I_0 \sigma c e^{-\mu_f L}$, will be scattered toward detector $D_2$.

Substituting said value for $i_2$ in said general absorption equation, using $I_2$ in place of $A$ for the intensity at detector $D_2$ again inserting $C$ to account for the sensitivity of detector $D_2$ toward photons of energy $E'$ because said detectors $D_1$ and $D_2$ have the same sensitivity, and taking into account the absorption over the distances $N_1$, $N_2$ and $d$, we have for the intensity $I_2$ which will be registered by said detector $D_2$:

$$I_2 = CI_0 \sigma c e^{-\mu_f L} e^{-\mu'_f N_2} e^{-\mu'_w d} \quad (3)$$

Both $I_1$ and $I_2$ are measured separately and the outputs of detectors $D_1$ and $D_2$ can, if desired, be recorded separately on a chart after which a ratio between the two outputs can be computed. Preferably, the ratio is computed in a ratio circuit either down hole or at the surface and the ratio signal transmitted to a recorder at the surface.

From FIGURE 1 it is believed clear that in the ratio $$R = \frac{I_1}{I_2}$$

if the formation were very dense (less porous) the denominator would be a relatively small value and therefore the ratio $R$ would be a large number or signal on the recording chart. If the formation is less dense (more porous) the denominator will be a relatively large value and ratio $R$ would be a relatively small number or signal on the recording chart.

Therefore, a ratio of $I_1$ to $I_2$ will afford a measure of the density of the formation. Accordingly, $$R = \frac{I_1}{I_2} = \frac{CI_0 \sigma c e^{-\mu'_f N_1} e^{-\mu'_w d}}{CI_0 \sigma c e^{-\mu_f L} e^{-\mu'_f N_1} e^{-\mu_f N_2} e^{-\mu'_w d}} \quad (4)$$

Cancelling like terms leaves only two factors in the denominator which can be moved to the numerator by making the exponents positive. Accordingly, $$R = e^{\mu_f L} e^{\mu'_f N_2} \quad (5)$$

From FIGURE 1 it is clear that $$\cos \phi = \frac{S}{L}, \quad L = \frac{S}{\cos \phi}$$

$$\tan \phi = \frac{N_2}{S}, \text{ and } N_2 = S \tan \phi$$

where $S$ = the distance between the detectors $D_1$ and $D_2$. Therefore, $$R = e^{\mu_f (S/\cos \phi)} e^{\mu'_f (S \tan \phi)} \quad (6)$$

It is believed clear from the last equation that the ratio $R$ is independent of the separation of the sonde (the distance $d$) from the formation or material being investigated.

Any suitable arrangement of electrical and electronic equipment can be employed for counting and recording the pulses or signals received by the detectors $D_1$ and $D_2$. said electrical and electronic components can be arranged in any suitable manner with a portion thereof down hole in the logging sonde and the remainder conveniently positioned at the surface of the earth. It is generally preferred to arrange said equipment with a minimum thereof in the logging sonde. Thus, generally speaking, only amplifiers of sufficient size and associated power source sufficient to transmit the pulses to the surface of the earth are positioned in the logging sonde.

Figure 2:
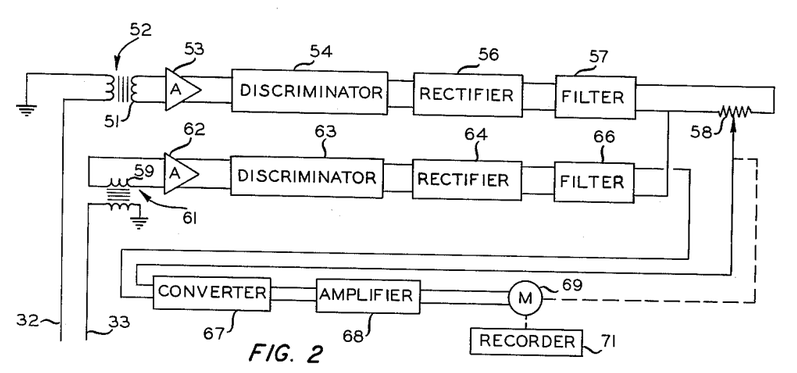
FIGURE 2 is a schematic circuit drawing of an arrangement of electrical and electronic components which can be employed in carrying out the method of the invention.

One suitable arrangement for measuring the ratio of the pulses or signals from said detectors $D_1$ and $D_2$ is illustrated in FIGURE 2. The circuit elements illustrated in the upper portion of FIGURE 2 are provided to measure the pulses from detector $D_1$ which are transmitted to said circuit elements by means of lead 32. The end terminals of the secondary winding 51 of transformer 52 are connected to the input terminals of an amplifier 53. The output terminals of amplifier 53 are connected to the input terminals of a discriminator 54 which is in effect an adjustable filter which passes only pulses of a predetermined amplitude. The output terminals of discriminator 54 are connected to the input terminals of rectifier 56, and the output terminals of said rectifier are connected to the input terminals of a filter 57. The output terminals of filter 57 are applied across the end terminals of a potentiometer 58. The direct voltage thus applied across potentiometer 58 is of a magnitude proportional to the discriminated pulses from detector $D_1$.

The circuit elements illustrated in the central portion of FIGURE 2 are provided to measure the pulses from detector $D_2$ which are transmitted to said circuit elements by means of lead 33. The end terminals of the secondary winding 59 of transformer 61 are applied to the input terminals of an amplifier 62. The output terminals of said amplifier 62 are connected to the input terminals of a discriminator 63 which in effect is an adjustable filter which passes only pulses of a predetermined amplitude. The output terminals of discriminator 63 are connected to the input terminals of rectifier 64, and the output terminals of said rectifier are connected to the input terminals of a filter 66. A first output terminal of said filter 66 is connected to a first input terminal of a converter 67. The second input terminal of converter 67 is connected to the contactor of potentiometer 58. The second output terminal of filter 66 is connected to one end terminal of potentiometer 58. The magnitude of the current from filter 66 is applied in opposition to the current from filter 57 at the point between the second output terminal of filter 57 and the contactor of potentiometer 58. If the discriminated pulses from detectors $D_1$ and $D_2$ are equal, there is no current flow to converter 67. If the two pulses are unequal, there is a current flow through the input circuit of converter 67 of a phase which is representative of the relative magnitudes of the two pulse counts being compared. Converter 67 changes the direct current flow in the input circuit thereof into a corresponding alternating current which is applied to the input terminals of an amplifier 68. The output terminals of amplifier 68 are connected to a reversible servo motor 69. The drive shaft of motor 69 is mechanically coupled to the contactor of potentiometer 58 and to recorder 71. The circuit comprising converter 67, amplifier 68, and servo motor 69 are shown only schematically, but can be any conventional circuit known in the art which converts a voltage difference into a corresponding motor rotation. A suitable circuit for this purpose is illustrated in the Electronic Control Handbook, Batcher and Moulic, Caldwell-Clements, Inc., New York, 1946, page 298, for example. Motor 69 moves the contactor of potentiometer 58 until the two voltages being compared are equal. The direction of rotation of motor 69 is determined by which of the two voltages being compared is of greater magnitude. All of the circuit elements illustrated in FIGURE 2 are positioned at the surface.

It is sometimes desirable to record the pulses or output signals from detectors $D_1$ and $D_2$ as separate tracings for purposes of detailed study. The ratio R can then be computed from the separate tracings. In such instances, the circuit arrangement illustrated in FIGURE 3, for example, can be employed. In FIGURE 3, the output of each detector is separately amplified as by means of the vacuum tubes 72 and 73, and the resulting signals are transmitted to the surface by separate insulated conductors 74 and 76, respectively. After amplification by amplifiers 77 and 78 at the surface, the output of said detectors $D_1$ and $D_2$ is then passed through discriminators 79 and 81, respectively, which pass only pulses or signals of a predetermined amplitude to the recording devices 82 and 83 which record separate tracings on chart 84 as shown.

Still another circuit arrangement which can be employed to record the output of detectors $D_1$ and $D_2$ as a ratio instead of separate traces, is illustrated in FIGURE 4. As there shown, this is done by impressing on the crossed coils 86 and 87, in the field of magnet 88, the respective outputs of amplifiers 79 and 81 of FIGURE 3. The ratio thus obtained is recorded as a single tracing on chart 89 as shown.

FIGURES 5, 6, 7, and 8 are included to further illustrate the geometry of the invention. In said FIGURES 5, 6, 7, and 8, it will be understood that the logging or measuring instrument is generally similar to that illustrated in FIGURE 1 but is shown schematically only so as to simplify said drawings. For this reason, the same reference numerals are employed in all of said figures even though the energy levels of the various beams of gamma rays and photons can be different from those in FIGURE 1 and are emitted from the source and received by the detectors at different angles in each figure.

Figure 5:
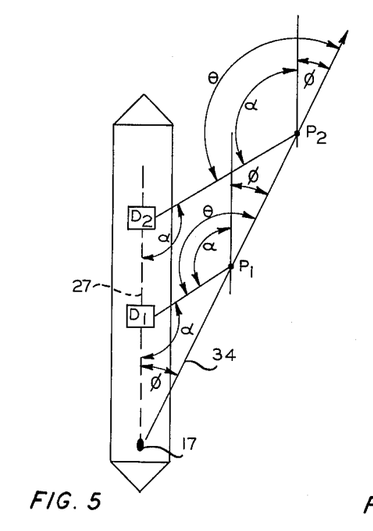
FIGURES 5, 6, 7, and 8 are diagrams illustrating other embodiments of the geometry of the invention.

In FIGURE 5, source 17 emits a collimated beam of gamma rays at an acute angle $\phi$ as indicated by line 34. Said beam of gamma rays is Compton scattered at the points $P_1$ and $P_2$. Compton scattered photons which have been scattered at an angle of $\theta = \phi + \alpha$ at each of said points $P_1$ and $P_2$ are received on said detectors $D_1$ and $D_2$ respectively at an obtuse angle $\alpha$ with respect to reference plane or axis 27. It will be noted that the angle $\alpha$ is the same at each of said detectors $D_1$ and $D_2$. It is believed obvious that the angles $\alpha$ and $\phi$ indicated at the points $P_1$ and $P_2$ are equal to the angles $\alpha$ and $\phi$ which are indicated at the detectors $D_1$ and $D_2$, and source 17, respectively. It is also believed obvious from the geometry indicated that the angles $\theta$ at each of said points $P_1$ and $P_2$ are also equal.

Figure 6:
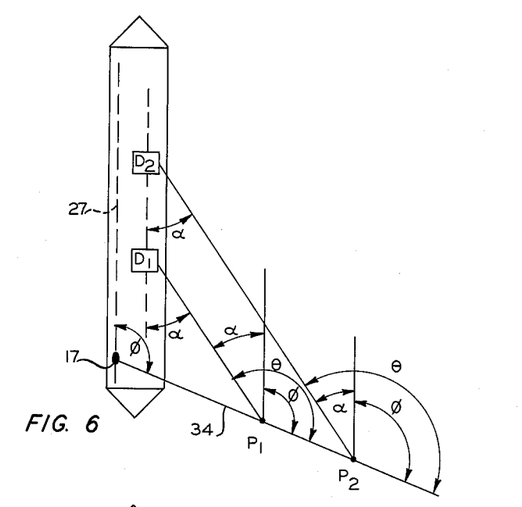

In FIGURE 6, it will be noted that the angles $\phi$ are obtuse angles and the angles $\alpha$ are acute angles whereas in FIGURE 5 the angles $\phi$ were acute angles and the angles $\alpha$ were obtuse angles. The same relationships between said angles $\phi$ (phi), $\alpha$ (alpha), and $\theta$ (theta) exists in FIGURE 6 as described in FIGURE 5.

Figure 7:
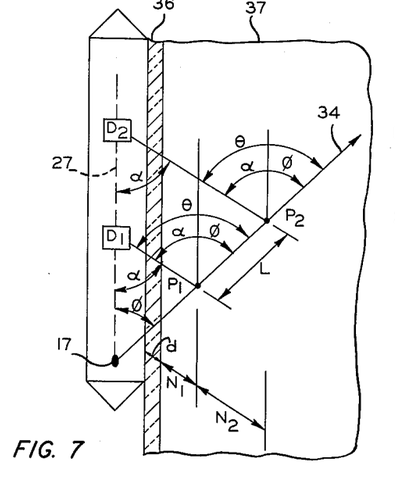

In FIGURE 7, it will be noted that the angles $\phi$ are acute angles and the angles $\alpha$ are also acute angles, thus presenting a different geometry from either of said FIGURES 5 and 6. It is believed obvious that the same relationship between said angles $\phi$, $\alpha$, and $\theta$ exists in FIGURE 7 as in FIGURES 1, 5, and 6.

FIGURE 7, partly in cross section, also illustrates employing the method of the invention to determine the density of a fluid or other material inside of an insulated container. A collimated beam 34 of gamma rays is directed through insulation 36 into the contents of container 37. Said contents can be a liquid or gas, liquid and gas with interface, solid, molten solid, etc., and said container can be any suitable container for said contents, e.g., tank, pipeline, blast furnace, etc.

Figure 8:
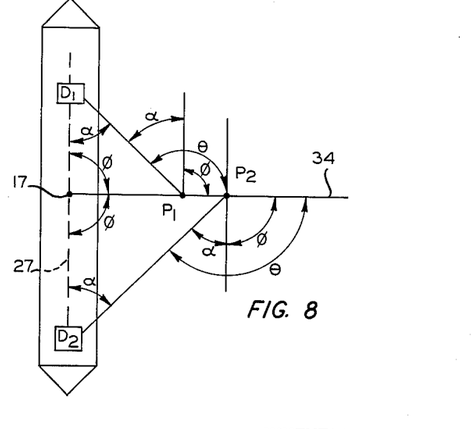

In FIGURE 8, it will be noted that detector $D_1$ is spaced apart on one side of source 17 and detector $D_2$ is spaced apart on the other side of said source 17. It will also be noted that the angles $\phi$ are right angles and that the angles $\alpha$ are acute angles with respect to the axis 27. It is believed obvious from the geometry illustrated that the same relationship between the angles $\phi$, $\alpha$, and $\theta$ exists in FIGURE 8 as exists in FIGURES 1, 5, 6, and 7.

Returning to FIGURE 6, it will be noted that reference plane 27, in which source 17 is positioned, does not contain the axis of the measuring instrument. It will also be noted that the detectors $D_1$ and $D_2$ are not positioned in said reference plane. Thus, it is not required that said source 17 and said detectors $D_1$ and $D_2$ be positioned in the same plane. However, it will be noted that the angles $\alpha$ at which the scattered photons are received at said detectors are the same.

Returning now to FIGURES 1 and 7, it will be noted that detector $D_1$ recives a first collimated beam of Compton scattered photons which have traveled a distance $N_1$ and a distance $d$ from a first point $P_1$ located in the path of the beam of gamma rays emitted from source 17. Detector $D_2$ receives a second collimated beam of Compton scattered photons from a second point $P_2$, also located in the path of said beam of gamma rays, but farther removed from said source 17. In traveling from point $P_2$ to detector $D_2$, said second beam of scattered photons also travels said distance $N_1$ and said distance $d$, but in addition travels an additional distance $N_2$. Since the distances $N_1$ and $d$ are the same with respect to each of said points $P_1$ and $P_2$, they, in effect, cancel out in comparing the energies detected and registered by said detectors $D_1$ and $D_2$. Thus, of the various distances set forth in FIGURES 1 and 7, only the distances L and $N_2$ are left to be considered. This relationship is developed mathematically above. It is believed clear the same relationship exists for the geometry illustrated in each of FIGURES 5, 6, and 8.

From the above description of FIGURES 1, 5, 6, 7, and 8, it is believed clear there are only a few requirements for the method of the invention from a geometry standpoint. The detectors $D_1$ and $D_2$ can be on the same side or on opposite sides of the source of gamma rays. When said detectors are on opposite sides of the source, they must be spaced apart an unequal distance from said source. Otherwise, referring to FIGURE 8, it is believed clear there would be only one point P and both of the detectors would receive scattered photons from the same point P. It is believed obvious that when said detectors are positioned on the same side of the source they are spaced apart an unequal distance from said source. Another requirement is that the angles α at which the scattered photons are received at the detectors must be the same at both detectors. Otherwise, the angle of scattering, θ, measured at the points $P_1$ and $P_2$ will be different.

The only limits on the size of the angle φ are those of practical consideration in connection with the material being investigated. The gamma rays can be directed into the material being investigated at any angle φ which is greater than zero and less than 180 degrees. It presently appears there would be more advantages in a method where said angle φ was within the range of 10 to 170 degrees. A presently preferred practical range for general purpose use is from 10 to 80 degrees, more preferably from 20 to 60 degrees. However, the invention is not limited to said ranges.

Similar considerations apply to the angles α. It presently appears there are more advantages in a method where the angles α are not more than 90 degrees. However, the invention is not so limited.

Similarly, the only limits on the spacings of the detectors $D_1$ and $D_2$ from the gamma source are those of practical consideration in connection with the material being investigated. Obviously there will be optimum spacings for each material or condition. The optimum spacing between the gamma source and the detector closest thereto ($D_1$) will be determined by the desired depth of investigation. The optimum spacing between said gamma source and the detector farthest therefrom ($D_2$) will be determined by the density of the material being investigated and the containment of the point $P_2$ within the material being investigated. However, as pointed out hereafter, in connection with Example III, the points $P_1$ and $P_2$ can be in different materials as when one is determining the interface between two materials of different density.

It is believed clear that although only one angle θ has been shown in FIGURE 1, i.e., at the point $P_1$, there will be a similar angle θ of the same magnitude at the point $P_2$ as in FIGURES 5–8 inclusive.

It should also be noted that the angles α are formed between the received beam of scattered photons and the axis of the instrument, or other reference plane, in which the source of emitted gamma rays is located and said angles α face said beam of emitted gamma rays. In other words, each of said angles α is an interior angle of a triangle formed by said instrument axis or a line in said reference plane, said emitted beam of gamma rays, and said beam of scattered photons. Since said angles α are equal in each individual embodiment of the geometry of the invention, it follows that the beams of scattered photons from points $P_1$ and $P_2$ will be parallel when both detectors $D_1$ and $D_2$ are on the same side of the source of gamma rays; see FIGURES 1, 5, 6, and 7.

In all of FIGURES 1, 5, 7, and 8 the path or trajectory of the gamma ray beams have been represented by geometrical lines, i.e., the invention has been described in terms of plane geometry in order to simplify said drawings. However, as will be understood by those skilled in the art, the geometry involved is solid geometry. Thus, in the practice of the invention in practical applications the angles involved are solid angles. The gamma source naturally emits radiation under a solid angle $\Omega_1$ and the detectors receive scattered photons under a solid angle $\Omega_2$. Similarly, in describing the invention reference has been made to an energy E' as being selectively received by said detectors. In practical applications, however, it is nearly always necessary or desirable to work with an energy band, i.e., $E' \pm \Delta E'$, where $\Delta E'$ represents the variation from the energy E' to be measured. The actual numerical values of $\Omega_1$, $\Omega_2$, and $\Delta E'$ are determined by the nature of the problem to be solved. For example, in determining the density of a small body of material under adverse conditions $\Omega_1$, $\Omega_2$, and $\Delta E'$ will necessarily be relatively small. In other situations, as in determining the density of a large homogeneous body of material with fixed geometrical conditions, either one or all three of said parameters $\Omega_1$, $\Omega_2$, and $\Delta E'$ can be increased.

The following examples will serve to further illustrate the invention.

*Example I*

Figure 9:
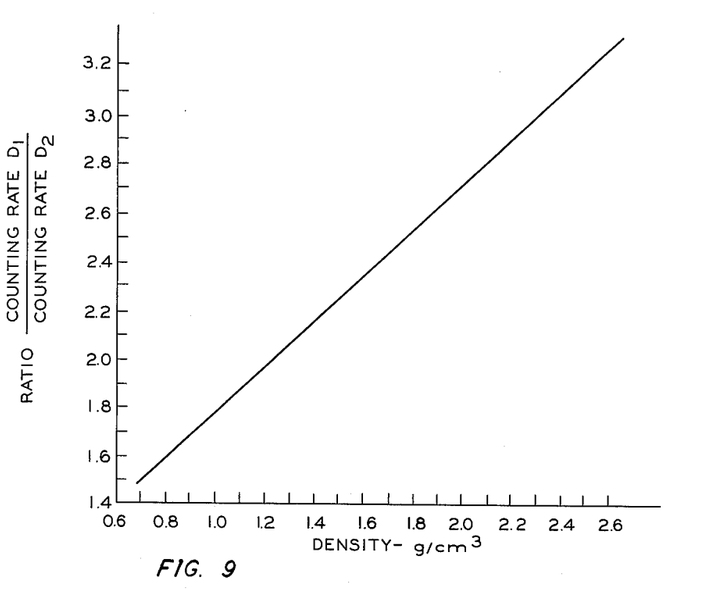
FIGURE 9 is a calibration curve for a particular instrument employed in the examples described hereinafter.

The method of the invention was tested employing a workbench model to determine the density of concrete blocks. The instrument contained a $Cs^{137}$ source that emitted a collimated beam of gamma rays at an angle φ of 40° with respect to the axis of the instrument. A first sodium iodide (thallium activated) scintillation detector $D_1$ was spaced apart a distance of five inches from said source so as to view and receive a collimated first beam of photons from within the concrete block which had been backscattered at an angle of θ=100° with respect to said beam of gamma rays. A second detector $D_2$ of the same type was spaced apart from said source a distance of seven inches, in the same direction as said first detector, so as to view and receive a collimated second beam of photons from within the concrete block which had been backscattered at an angle of θ=100° with respect to said beam of gamma rays. The device was calibrated with three specially prepared concrete blocks having known densities of 2.4, 1.8, and 0.7 g./cc., respectively. FIGURE 9 shows the calibration curve obtained.

A block of polyethylene having a thickness of one inch was then placed between the instrument and the heaviest of said concrete blocks, i.e., density of 2.4 g./cc. Pulse counting rates from the two detectors $D_1$ and $D_2$ showed the density of said concrete block, as measured through said block of polyethylene, to be 2.4 g./cc. This example is illustrated schematically in FIGURE 10.

*Example II*

Figure 10:
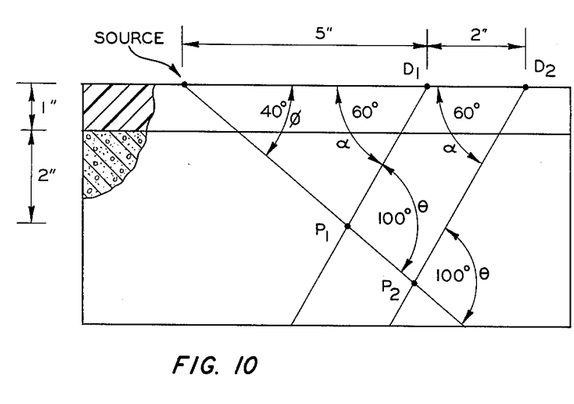
FIGURES 10, 10–A, and 10–B are schematic diagrams illustrating the embodiments of the invention described in the examples given hereinafter.

The density of said heavy block of concrete (density equals 2.4 g./cc.) was then measured through a block of polyethylene two inches in thickness. Pulse counting rates from the two detectors $D_1$ and $D_2$ showed the density of said concrete block as measured through said polyethylene block to be 2.4 g./cc. This example is also illustrated schematically in FIGURE 10, assuming the concrete block and polyethylene block cross section shown in FIGURE 10–A.

It is believed clear that the above Examples I and II clearly show that the method of the invention is independent of the separation of the probe or measuring instrument from the sample being measured because the density of the concrete block was correctly determined to be 2.4 g./cc. in both instances.

*Example III*

The density of said heavy concrete block was then determined through a block of polyethylene having a thickness of three inches which had been placed between the instrument and said heavy block of concrete. Pulse rate countings of the detectors $D_1$ and $D_2$ indicated the density of the concrete block to be 1.4 g./cc. This is, of course, markedly different from the true and correct density of 2.4 g./cc. This result was expected, however, because the instrument had been designed to be independent of the separation of the instrument from the sample up to a distance of approximately 2.5 inches only. Reference to FIGURE 10 will show the reason for the density reading of 1.4 g./cc. When the three inch thick polyethylene block was placed between the measuring instrument and the concrete block, with the angle φ and the detector spacing remaining unchanged, the detector $D_1$ was receiving a beam of photons which had been scattered at point $P_1$ within the polyethylene block, whereas the detector $D_2$ was receiving a beam of photons which had been scattered at point $P_2$ from within the concrete block.

It is believed clear that the results of this example illustrate the use of the method of the invention for determining the interface between layers of different materials. When the interface is parallel to the axis of the instrument as in FIGURE 10, the interface can be approximated as in Example III and can then be located more accurately by suitable adjustment of the angle $\phi$. When the interface traverses the axis of the measuring instrument, as would be the case of an instrument positioned in a bore hole which penetrates a plurality of formations, said interface can be located by moving the instrument in a plane which traverses said interface and correlating the movement of said instrument with the pulse count rates of detectors $D_1$ and $D_2$.

The invention has been described as particularly applicable to the logging of bore holes, e.g., determining the density of formations penetrated by said bore hole. It is believed clear from the above that the method of the invention has many other uses. For example, the determination of liquids within pipes or other containers, the density of materials inside of furnaces such as blast furnaces by measurement through the wall of the furnace, density of materials covered by protective materials such as paint or insulation, the location of interfaces between gas and liquid in a container, the location of the height of the cement column in a well wherein the casing has been cemented, the location of interfaces between formations penetrated by a bore hole, and many others.

In some of the above equations, such as (2) and (3) for example, equal signs (=) have been employed as a matter of convenience, instead of the customary proportional sign ($\sim$), without inserting a proportionately constant because said constant merely cancels out as is shown by Equation 5.

In the above descriptions of the various embodiments of the invention, the Compton scattered photons referred to and counted or measured have been considered as single scattered photons. As is well known by those skilled in the art, Compton scattering also involves multiple scattering. However, the energy of a scattered photon depends upon its initial energy and the number of times it has been scattered because each time a photon is scattered it loses energy. The singly scattered photons and the photons which have undergone double or multiple scattering can be effectively separated because of this difference in energy. This separation is accomplished by means of the energy discriminators such as 54 and 63 which selectively transmit only the impulses of a given amplitude or relatively narrow range of amplitude representing the photons having an energy of $E'$ which it is desired to selectively count.

While certain embodiments of the invention have been described for illustrative purposes, the invention obviously is not limited thereto. Various other modifications will be apparent to those skilled in the art in view of this disclosure. Such modifications are within the spirit and scope of the invention.

I claim:

1. A method for determining the density of a material, which method comprises: passing gamma rays from a source into said material along at least one trajectory at an incident angle $\phi$ with respect to a reference plane in which said source is positioned; receiving respectively from within said material at an angle $\alpha$ with respect to said reference plane on first and second detectors, unequally spaced apart from said source, Compton scattered photons which have been scattered at an angle $\theta$ with respect to said trajectory of said gamma rays; and measuring the ratio of the responses of said detectors.

2. The method of determining the density of a material, which method comprises: passing gamma rays from a source into said material along at least one trajectory at an angle $\phi$ with respect to a reference plane in which said source is positioned; receiving from within said material, at an angle $\alpha$ with respect to said reference plane, on a first detector spaced apart from said source, Compton scattered photons which have been scattered at an angle of $\theta=\phi+\alpha$ with respect to said path of gamma rays; receiving from within said material, at an angle $\alpha$ with respect to said reference plane, on a second detector spaced apart from said source a greater distance than said first detector, other Compton scattered photons which have also been scattered at an angle of $\theta=\phi+\alpha$ with respect to said trajectory of said gamma rays; and selectively measuring the ratio of the response of said first detector to the response of said second detector.

3. The method of determining the density of a material, which method comprises: passing gamma rays from a source into said material along at least one trajectory at an angle $\phi$ with respect to a reference plane in which said source is positioned; receiving from within said material, at an angle $\alpha$ with respect to said reference plane, on a first detector spaced apart from said source, a first collimated beam of Compton scattered photons which have been scattered at an angle of $\theta=\phi+\alpha$ with respect to said beam of gamma rays; receiving from within said material, at an angle $\alpha$ with respect to said reference plane, on a second detector spaced apart from said source a greater distance than said first detector, a second collimated beam of Compton scattered photons which have also been scattered at an angle of $\theta=\phi+\alpha$ with respect to said trajectory of said gamma rays; and selectively measuring the ratio of the response of said first detector to the response of said second detector.

4. The method of determining the density of a material, which method comprises: passing a collimated beam of gamma rays from a source into said material at an angle $\phi$ with respect to a reference plane in which said source is positioned; receiving from within said material, at an angle $\alpha$ with respect to said reference plane, on a first detector spaced apart from said source, Compton scattered photons which have been scattered at an angle of $\theta=\phi+\alpha$ with respect to said beam of gamma rays; receiving from within said material, at an angle $\alpha$ with respect to said reference plane, on a second detector spaced apart from said source a greater distance than said first detector, Compton scattered photons which have also been scattered at an angle of $\theta=\phi+\alpha$ with respect to said beam of gamma rays; and selectively measuring the ratio of the response of said first detector to the response of said second detector.

5. The method of determining the density of a material, which method comprises: passing a collimated beam of gamma rays from a source into said material at an angle $\phi$ with respect to a reference plane in which said source is positioned; receiving from within said material, at an angle $\alpha$ with respect to said reference plane, on a first detector spaced apart from said source, a first collimated beam of Compton scattered photons which have been scattered at an angle of $\theta=\phi+\alpha$ with respect to said beam of gamma rays; receiving from within said material, at an angle $\alpha$ with respect to said reference plane, on a second detector spaced apart from said source a greater distance than said first detector, a second collimated beam of Compton scattered photons which have been scattered at an angle of $\theta=\phi+\alpha$ with respect to said beam of gamma rays; and selectively measuring the ratio of the response of said first detector to the response of said second detector.

6. The method of determining the density of a material, which method comprises: passing a collimated beam of gamma rays, from a source positioned in a reference plane adjacent said material, into said material at an angle $\phi$ with respect to said reference plane; respectively receiving a first and a second collimated beam of Compton scattered photons from within said material, at an angle $\alpha$ with respect to said reference plane, on first and second detectors unequally spaced apart from said source; and measuring the ratio of the responses of said detectors, said detectors being sensitive only to photons which have been scattered at an angle of $\theta=\phi+\alpha$ from said beam of gamma rays.

7. The method of determining the density of a material, which method comprises: passing a collimated beam of gamma rays, from a source positioned in a reference plane adjacent said material, into said material at an angle $\phi$ with respect to said reference plane; receiving from within said material, at an angle $\alpha$ with respect to said reference plane, on each of a pair of detectors unequally spaced apart from said source, a collimated beam of Compton scattered photons which have been scattered at an angle of $\theta=\phi+\alpha$ with respect to said beam of gamma rays; and measuring the ratio of the responses of said detectors.

8. The method of determining the density of a material, which method comprises: passing a collimated beam of gamma rays, from a source positioned in a reference plane adjacent said material, into said material at an angle $\phi$ with respect to said reference plane; receiving from within said material, at an angle $\alpha$ with respect to said reference plane, on each of a pair of detectors unequally spaced apart from said source, a collimated beam of only those Compton scattered photons which have been scattered at an angle of $\theta=\phi+\alpha$ with respect to said beam of gamma rays; and selectively measuring the counting rate of photons received at each of said detectors; and measuring the ratio of said counting rates.

9. The method of determining the density of a material, which method comprises: passing a collimated beam of gamma rays, from a source positioned in a reference plane adjacent said material, into said material at an acute angle $\phi$ with respect to said reference plane; respectively receiving from within said material, at an angle $\alpha$ of not more than 90 degrees with respect to said reference plane, on first and second detectors unequally spaced apart from said source, a first and a second collimated beam of Compton scattered photons which have been scattered at an angle of $\theta=\phi+\alpha$ with respect to said beam of gamma rays; and measuring and recording the ratio of the responses of said detectors.

10. The method of claim 9 wherein said angle $\phi$ is within the range of 10 to 80 degrees.

11. The method of claim 9 wherein said angle $\phi$ is within the range of 20 to 60 degrees.

12. The method of determining the density of a material, which method comprises: passing a collimated beam of gamma rays, from a source positioned in a reference plane adjacent said material, into said material at an angle $\phi$ with respect to said reference plane; receiving from within said material, at an angle $\alpha$ with respect to said reference plane, on a first detector spaced apart from said source, a first collimated beam of Compton scattered photons which have been scattered at an angle of $\theta=\phi+\alpha$ with respect to said beam of gamma rays and which have traveled a given distance from a first point positioned in the path of said beam of gamma rays; receiving from within said material, at an angle $\alpha$ with respect to said reference plane, on a second detector spaced apart from said source a greater distance than said first detector, a second collimated beam of Compton scattered photons which have been scattered at an angle of $\theta=\phi+\alpha$ with respect to said beam of gamma rays and which have traveled said given distance plus an additional distance from a second point also positioned in the path of said beam of gamma rays and farther from said source; and measuring and recording the ratio of the responses of said first and said second detectors.

13. The method of determining the density of a formation penetrated by a well bore, comprising the steps of: positioning in said well bore a source of gamma rays, a first detector of gamma rays, and a second detector of gamma rays, said source and said detectors being arranged in fixed relationship with said detectors being unequally spaced apart from said source; passing a collimated beam of gamma rays from said source into said formation at an angle $\phi$ with respect to a reference plane in which said source is positioned; receiving respectively on said first and second detectors from within said formation, at an angle $\alpha$ with respect to said reference plane, a first and a second collimated beam of Compton scattered photons which have been scattered at an angle of $\theta=\phi+\alpha$ with respect to said beam of gamma rays; and measuring the ratio of the responses of said first and second detectors.

14. The method of gamma ray well bore logging comprising, the steps of: passing through said well bore a source of gamma rays, a first detector of gamma rays, and a second detector of gamma rays, said source and said detectors being arranged in fixed relationship with said detectors being unequally spaced apart from said source; passing a collimated beam of gamma rays from said source, at an angle $\phi$ with respect to a reference plane in which said source is positioned, into a formation penetrated by said well bore; receiving on said first detector from within said formation, at an angle $\alpha$ with respect to said reference plane, a first collimated beam of Compton scattered photons which have been scattered at an angle $\theta=\phi+\alpha$ with respect to said beam of gamma rays and which have traveled a given distance from a first point positioned in the path of said beam of gamma rays; receiving on said second detector from within said formation, at an angle $\alpha$ with respect to said reference plane, a second collimated beam of Compton scattered photons which have been scattered at an angle of $\theta=\phi+\alpha$ with respect to said beam of gamma rays and which have traveled said given distance plus an additional distance from a second point also positioned in the path of said beam of gamma rays and farther from said source; measuring the ratio of the responses of said detectors; and recording said ratio as a function of depth in said well bore.

15. The method of claim 14 wherein said angle $\phi$ is an acute angle, and said angle $\alpha$ is not more than 90 degrees.

16. The method of claim 15 wherein said angle $\phi$ is within the range of 10 to 80 degrees.

17. The method of determining the density of a fluid within a container, which method comprises the steps of: placing adjacent said container a source of gamma rays, a first detector of gamma rays, and a second detector of gamma rays, said source and said detectors being arranged in fixed relationship with said detectors being unequally spaced apart from said source; passing a collimated beam of gamma rays from said source into said fluid within said container at an angle $\phi$ with respect to a reference plane in which said source is positioned; receiving respectively on said first and second detectors from within said liquid, at an angle $\alpha$ with respect to said reference plane, a first and a second collimated beam of Compton scattered photons which have been scattered at an angle of $\theta=\phi+\alpha$ with respect to said beam of gamma rays; and measuring the ratio of the responses of said first and second detectors.

18. The method of determining the location of an interface between two adjacent materials having different densities, which method comprises the steps of: moving in a plane which traverses said interface, a source of gamma rays, a first detector of gamma rays, and a second detector of gamma rays, said source and said detectors being arranged in fixed relationship with said detectors being unequally spaced apart from said source; passing a collimated beam of gamma rays from said source, at an angle $\phi$ with respect to a reference plane in which said source is positioned, into at least one of said materials; receiving on said first and second detectors respectively from within said materials, each at an angle $\alpha$ with respect to said reference plane, a first and a second collimated beam of Compton scattered photons which have been scattered at an angle of $\theta=\phi+\alpha$ with respect to said beam of gamma rays; measuring the ratio of the responses of said detectors; and indicating said ratio as a function of said movement of said source and said detectors.

19. A method for determining the location of an interface between two adjacent materials having different densities, which method comprises: passing gamma rays from a source into and through said material along at least one trajectory at an incident angle $\phi$ with respect to a reference plane in which said source is positioned; receiving from a first point along said trajectory, at an angle $\alpha$ with respect to said reference plane, on a first detector spaced apart from said source, Compton scattered photons which have been scattered at an angle of $\theta = \phi + \alpha$ with respect to said trajectory of said gamma rays; simultaneously receiving from a second point farther along said trajectory, also at an angle $\alpha$ with respect to said reference plane, on a second detector spaced apart from said source a greater distance than said first detector, other Compton scattered photons which have also been scattered at an angle of $\theta = \phi + \alpha$ with respect to said trajectory of said gamma rays; varying the depth of detection for scattered photons received from at least one of said points over a range sufficient to traverse said interface; and measuring the ratio of the responses of said detectors during said variation in depth of detection.

20. A method for determining the interfaces between a first material and materials adjacent thereto having densities different from the density of said first material, which method comprises: passing gamma rays from a source into and through said first material along at least one trajectory at an incident angle $\phi$ with respect to a reference plane in which said source is positioned; receiving from a first point along said trajectory, at an angle $\alpha$ with respect to said reference plane, on a first detector spaced apart from said source, Compton scattered photons which have been scattered at an angle of $\theta = \phi + \alpha$ with respect to said trajectory of said gamma rays; simultaneously receiving from a second point farther along said trajectory, also at an angle $\alpha$ with respect to said reference plane, on a second detector spaced apart from said source a greater distance than said first detector, other Compton scattered photons which have also been scattered at an angle of $\theta = \phi + \alpha$ with respect to said trajectory of said gamma rays; varying the depth of detection for scattered photons received from at least one of said points over a range sufficient to traverse said interfaces; and measuring the ratio of the responses of said detectors during said variation in depth of detection.

References Cited by the Examiner

UNITED STATES PATENTS

| | | | |
|---|---|---|---|
| 2,776,378 | 1/57 | Youmans | 250—83.6 |
| 2,934,652 | 4/60 | Caldwell et al. | 250—83.6 |
| 3,061,725 | 10/62 | Green | 250—83.6 X |

RALPH G. NILSON, *Primary Examiner.*

ARCHIE R. BORCHELT, *Examiner.*